United States Patent [19]

McKenney et al.

[11] 4,362,949

[45] Dec. 7, 1982

[54] LOAD CONTROLLER HAVING TIME INTEGRATED DEMAND

[75] Inventors: James L. McKenney, Norwell, Mass.; Robert H. Stevenson, Barrington, R.I.

[73] Assignee: Vapor Corporation, Chicago, Ill.

[21] Appl. No.: 283,365

[22] Filed: Jul. 15, 1981

Related U.S. Application Data

[63] Continuation-in-part of Ser. No. 5,304, Jan. 22, 1979, Pat. No. 4,305,005.

[51] Int. Cl.³ .................. H02J 4/00; G05D 23/19
[52] U.S. Cl. ........................ 307/31; 307/39; 307/117; 219/483; 219/486
[58] Field of Search .............. 307/31, 34, 35, 38, 307/39, 117; 165/12; 219/483–486, 490, 492, 494, 510; 361/161, 162, 170

[56] References Cited

U.S. PATENT DOCUMENTS

| | | | |
|---|---|---|---|
| 3,787,729 | 1/1974 | Bennett | 307/117 |
| 4,106,690 | 8/1978 | Tomlinson | 165/12 |
| 4,305,005 | 12/1981 | McKenney et al. | 219/483 X |

FOREIGN PATENT DOCUMENTS

| | | |
|---|---|---|
| 1146256 | 3/1969 | United Kingdom . |
| 1228722 | 4/1971 | United Kingdom . |
| 1277589 | 6/1972 | United Kingdom . |
| 1543564 | 4/1979 | United Kingdom . |

*Primary Examiner*—G. Z. Rubinson
*Assistant Examiner*—S. D. Schreyer
*Attorney, Agent, or Firm*—Francis J. Lidd

[57] ABSTRACT

A load controller, primarily intended for use in systems having geographically distributed, energy utilizing loads, and employing stored energy heating apparatus. The controller (1, 10) disclosed, in conjunction with a stored energy heater (3, 4), when installed on an energy distribution system having a multiplicity of heaters and controllers, adjusts individual heater storage (3), providing adequate energy for varying heat requirements of individual heaters after a mandatory "off" period (46, 47, 49, 51), thereby greatly reducing the overall peak energy or demand requirements on a central energy source. Alternate embodiments utilize a microprocessor (300) to provide close control of heater storage and improve efficiency. Digital display (307) and a keyboard input are provided for adjusting system constants and evaluating unit operation.

10 Claims, 17 Drawing Figures

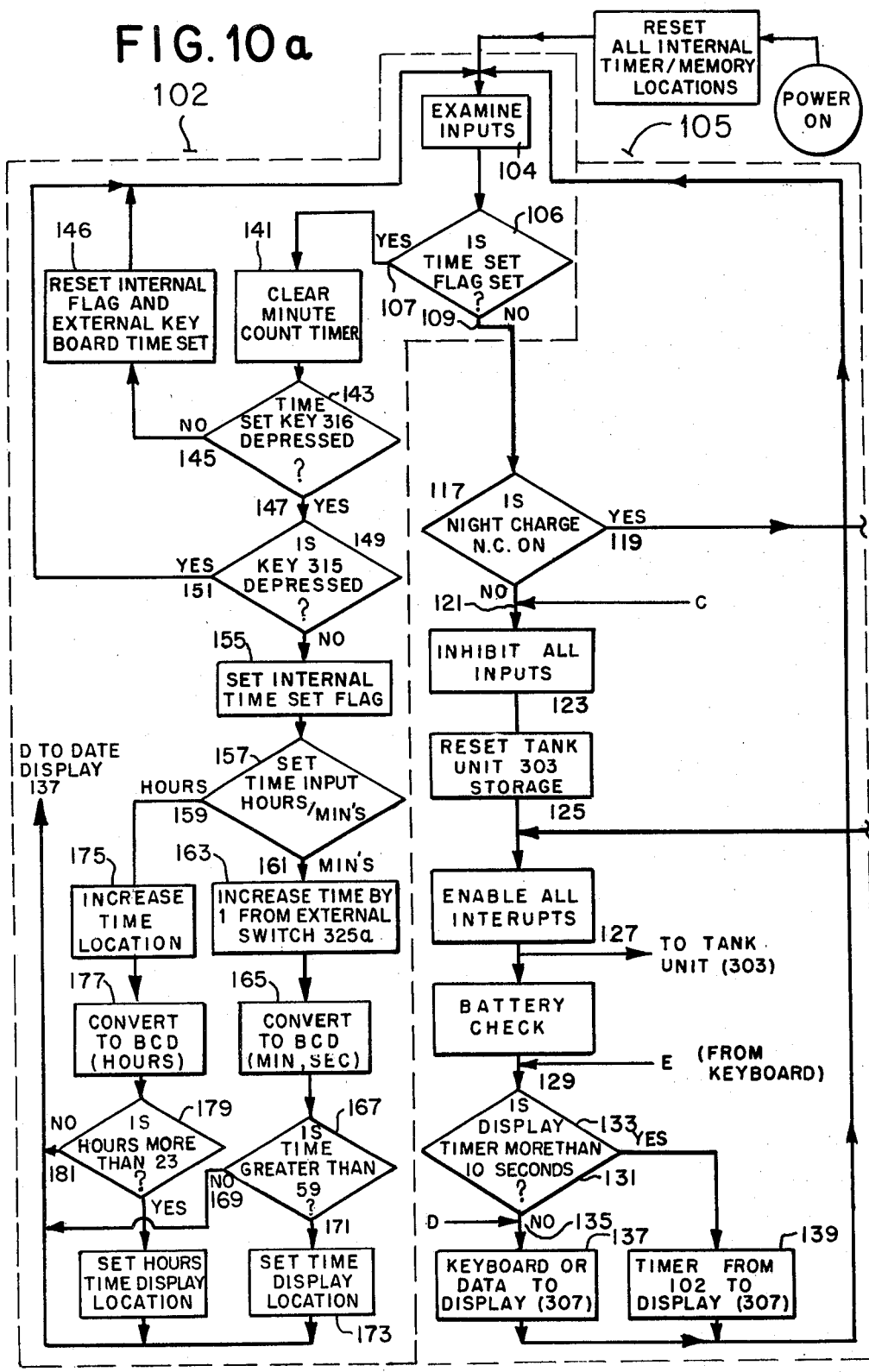

FIG. 13

$$(325) \quad T_{TF(\text{TANK FINAL TEMP. IN °F})} = \frac{10{,}200 - 150 \times T_{OUTSIDE}}{68} + 140$$

$$(320) \quad H_{L(\text{HEAT LOSS AT } T_{OUTSIDE/AMBIENT})} = H_{HLI}\left[\frac{68 - T_{OUTSIDE}}{68}\right]$$

$$(323) \quad K_{W(\text{CHARGE})} = \left[\frac{T_{TF} - T_{TI}}{t_{(\text{NIGHT CHARGE})}}\right] \times .8 + H_L$$

$$(348) \quad \text{HEAT ZONES ON} = \frac{K_W}{6}$$

$$(346) \quad \Delta T \text{ (DELTA T)} = \frac{T_{TF} - T_{T(\text{MEASURED})}}{t \text{ (CHARGE TIME / INTERVAL)}}$$

FIG. 15

| 1 | 2 | 3 | (LOSS) $H_L$ | NIGHT CHARGE NC | (RESAMPLE) $R_S$ |
|---|---|---|---|---|---|
| 4 | 5 | 6 | ZONE ✱ DISPLAY | | TANK TEMP. COMPARE POINT |
| 7 | 8 | 9 | CLEAR | | AUTO RESET |
| C | 0 | Run | | | | under control of the micro-processor may be scheduled to periods of low utility demand.

LOAD CONTROLLER HAVING TIME INTEGRATED DEMAND

RELATED APPLICATIONS

This application is a continuation-in-part of copending application Ser. No. 5,304 filed on Jan. 22, 1979, U.S. Pat. No. 4,305,005. The specification of that application including all allowed amendments are hereby fully incorporated into this application by reference.

BACKGROUND OF THE INVENTION

This invention relates generally to peak demand control on utility electrical systems, and more particularly concerns the reduction of a secondary peak of power drawn by a number of distributed electrical loads using energy storage equipment.

Prior art U.S. Pat. Nos. 3,906,242, 4,023,043, 3,630,275, and 3,422,248, hereby fully incorporated by reference, disclose methods of controlling peak loads on electrical utility distribution systems, and stored energy electrical heating apparatus respectively. Operation of the above mentioned apparatus has been highly satisfactory and many units are in operation, effectively providing utilities with an "interruptable" load for pre-determined periods. Use of this type of heater allows the electrical utilities to essentially even out demand over a twenty-four hour period. This reduction in demand "peaks" results in substantial financial savings to the utilities in that extra generating capacity need not be installed, or higher cost "peaking" power need not be used.

The central control systems disclosed in U.S. Pat. Nos. 3,906,242, and 4,023,043, however, have not found wide use due to the difficulties involved in maintaining individual signal responsive equipment located at the site of each stored energy heater.

Therefore, it has become common practice to control the power-off period of individual stored energy loads through the use of a simple time clock attached to each unit providing cycles of power-on and power-off periods. "Power-on" periods are usually in the range of four to twelve hours in a twenty-four hour period although other cycles are used, some having more than one "power-on" period in 24 hours.

However, if a substantial number of units are connected to a given utility system it has been found that after a power-off period, a high percentage of the storage loads are operating at reduced temperature due to the heat draws during the power off interval. If a simple temperature controller is utilized to establish a maximum limit in the energy storage, at the conclusion of each power-off period, a large number of units will be connected to the utility lines thereby producing what has become known as a "secondary peak".

Secondary peaks, while greatly reduced from the prior or primary peak, are still undesirable.

Therefore, it is the object of this invention to provide a controller which utilizes the existing stored energy temperature, and the ambient temperature, in a predetermined combination to provide a diversity of power demands among a plurality of geographically distributed stored energy heaters connected to a utility system.

It is a further object of this invention to provide a method for reducing "secondary peaks" on an electrical utility through the use of a self-contained, self-operating controller which automatically adjusts the power requirements of the individual stored energy heater to minimize the power draw after a substantial power-off period.

It is a still further object of this invention to provide a method for controlling secondary peaks which is locally adjustable to individual loads and thereby provides substantial diversity in overall power requirements for a plurality of connected stored energy heaters on a given utility distribution system.

It is an additional object of this invention to provide a controller for a stored energy electrical heater which continuously measures the storage temperature, ambient temperature, and provides self-determined adjustment of the unit power requirements after a substantial "power-off" period.

It is a further object to this invention to provide a controller embodying the above objects and further utilizing micro-computer techniques to provide additional control of tank storage temperature and power consumption through improved estimation of heating requirements in a follow-on "power-off".

BRIEF DESCRIPTION OF THE INVENTION

A particularly valuable and novel controller is provided through the use of the micro-computer which repetitively computes heat loss requirements, and performs adjustments to the power input during a power-on period to adjust heat storage so as to minimize the possibility of exhausting the heat supply during a subsequent poweroff period. An additional novel and advantageous feature provided is provision for adjusting and/or updating the controller function through the use of an external keyboard. Keyboard input allows the user to reset power-on and power off periods, adjust allowable maximum storage temperatures, and vary peak power supplied to the heater storage. Additional heater readouts in the above mentioned display can be obtained through interrogation via the external keyboard.

An additional embodiment of the invention utilizing a micro-processor provides adjustment of the storage tank temperature coordinated with overall electrical demand. This type of operation known to those skilled in the art as a "power demand controller" total electrical power draw of a building, industrial process, or other entity whose power payment is dependent on not exceeding a previously determined maximum value of kilowatts drawn from the supplying power utility. As is well known in the art, electrical payments in many cases are predicted on the maximum amount of power drawn by a specific customer during a predetermined period—most commonly 30 days. Therefore, it is of substantial advantage to a user of electric power if power demand can be held to a previously agreed upon maximum.

In the embodiment disclosed here a deferable load such as a stored energy heater is used in combination with a load controller which in operation "sheds" a part or all of the storage heating in order to maintain maximum power draw demand at a contractual level, thus minimizing the cost of power to the user. This type of operation defers heating to a period of low power demand and in some cases allows the customer to operate during a power off period.

Cyclic micro-processor checking and comparison of actual and predetermined maximum demand allow utilizing portions of stored heat input to the storage tank. This operation can occur at any time during the day, or as indicated above can be limited to a "power on" period. The last mentioned operation provides the dual advantages of holding power demand at or below a predetermined period, while at the same time operate during an additionally predetermined power on period.

A particular feature of the embodiment involves utilization of the storage temperature either at a specific time of day, or at the end of a power off period of readjust storage as a function of the demand reflected by the storage temperature. In this way, as seasonal and/or other demands vary from day to day, it is possible to adjust the tank heating level independently of the maximum demand. Under these conditions, therefore, both tank power input and overall system demand would be adjusted or optimized for any such cyclic variations in load.

BRIEF DESCRIPTION OF THE DRAWINGS

FIG. 13—Representative formulas used in determining required heat to be added to storage.

FIG. 14b is a continuation of FIG. 14a.

FIG. 15 shows the keyboard input, particularly showing keys for entering the tank temperature and establishing the power inputs to storage.

DETAILED DESCRIPTION OF THE INVENTION

Figure 1:
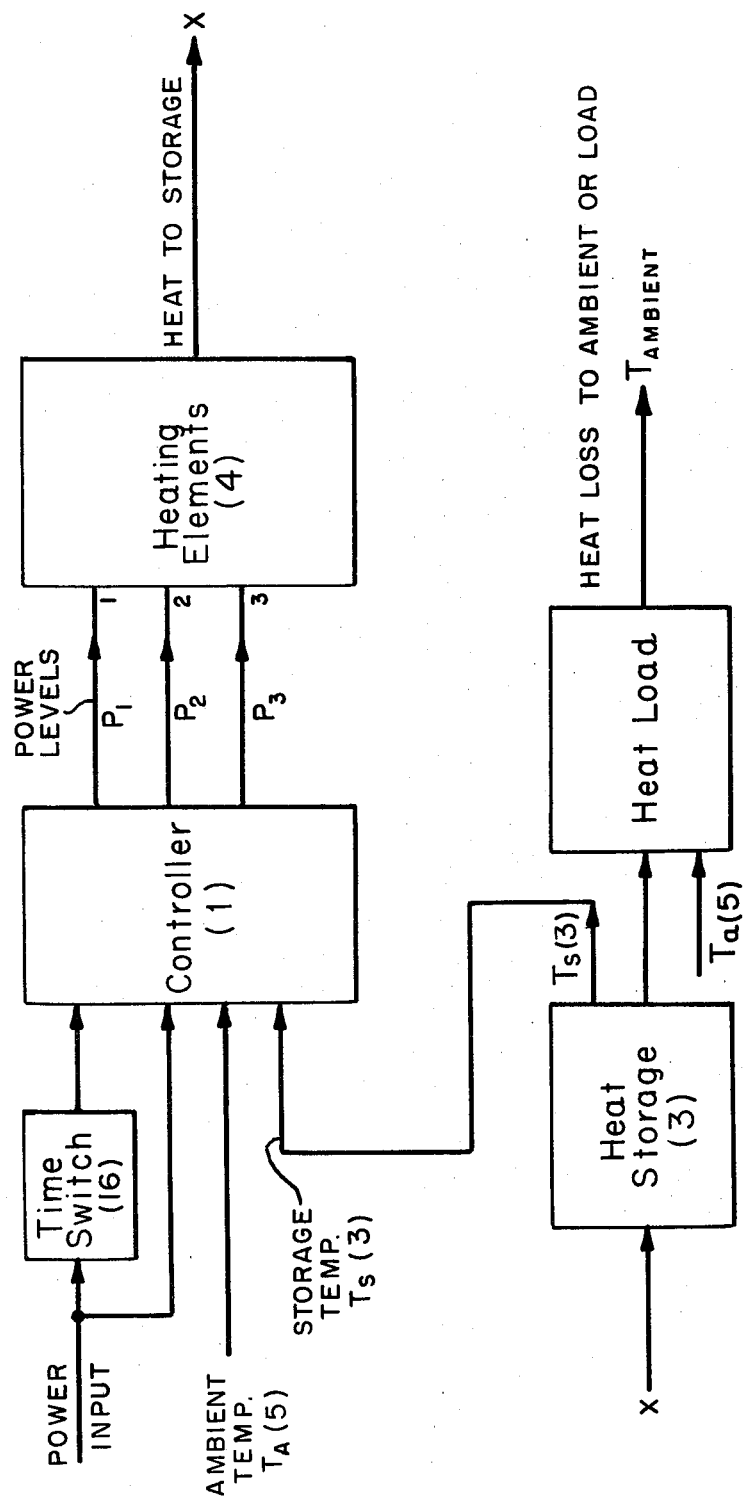
FIG. 1—Block semi-schematic energy flow diagram showing controller used with stored energy heater in typical heating application.
Figure 2:
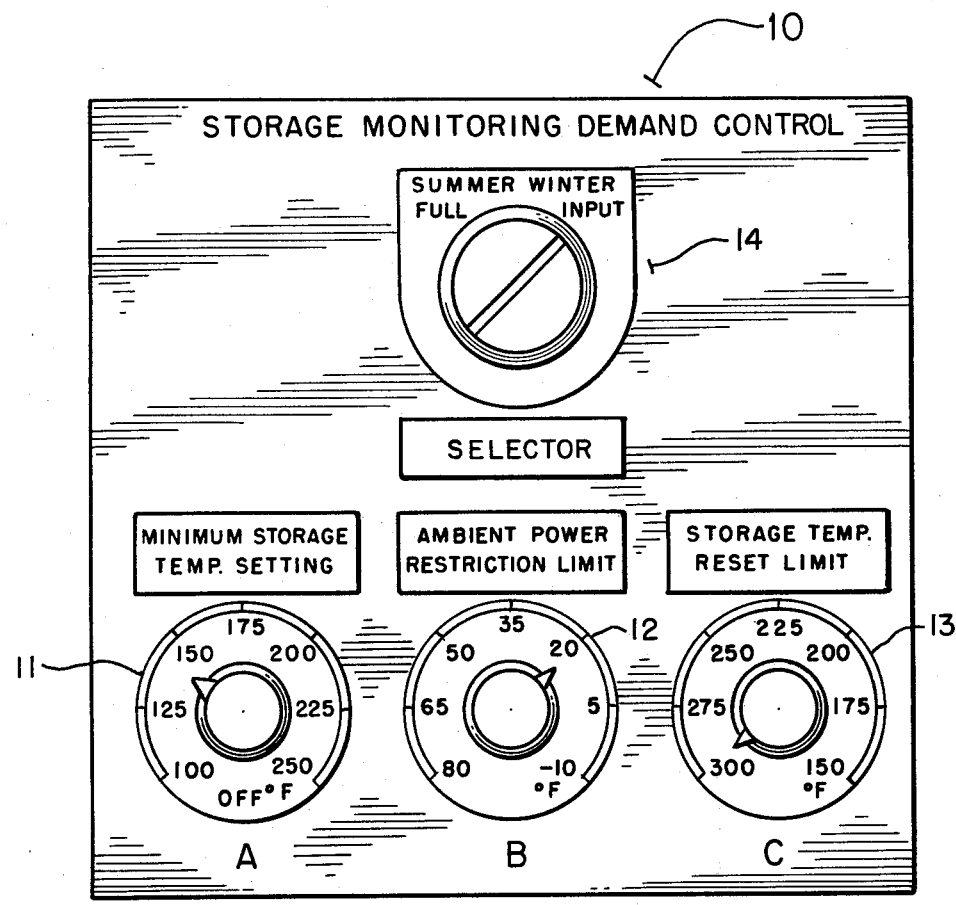
FIG. 2—Typical control panel of the controller showing adjustment dials, and seasonal selector switch.
Figure 3:
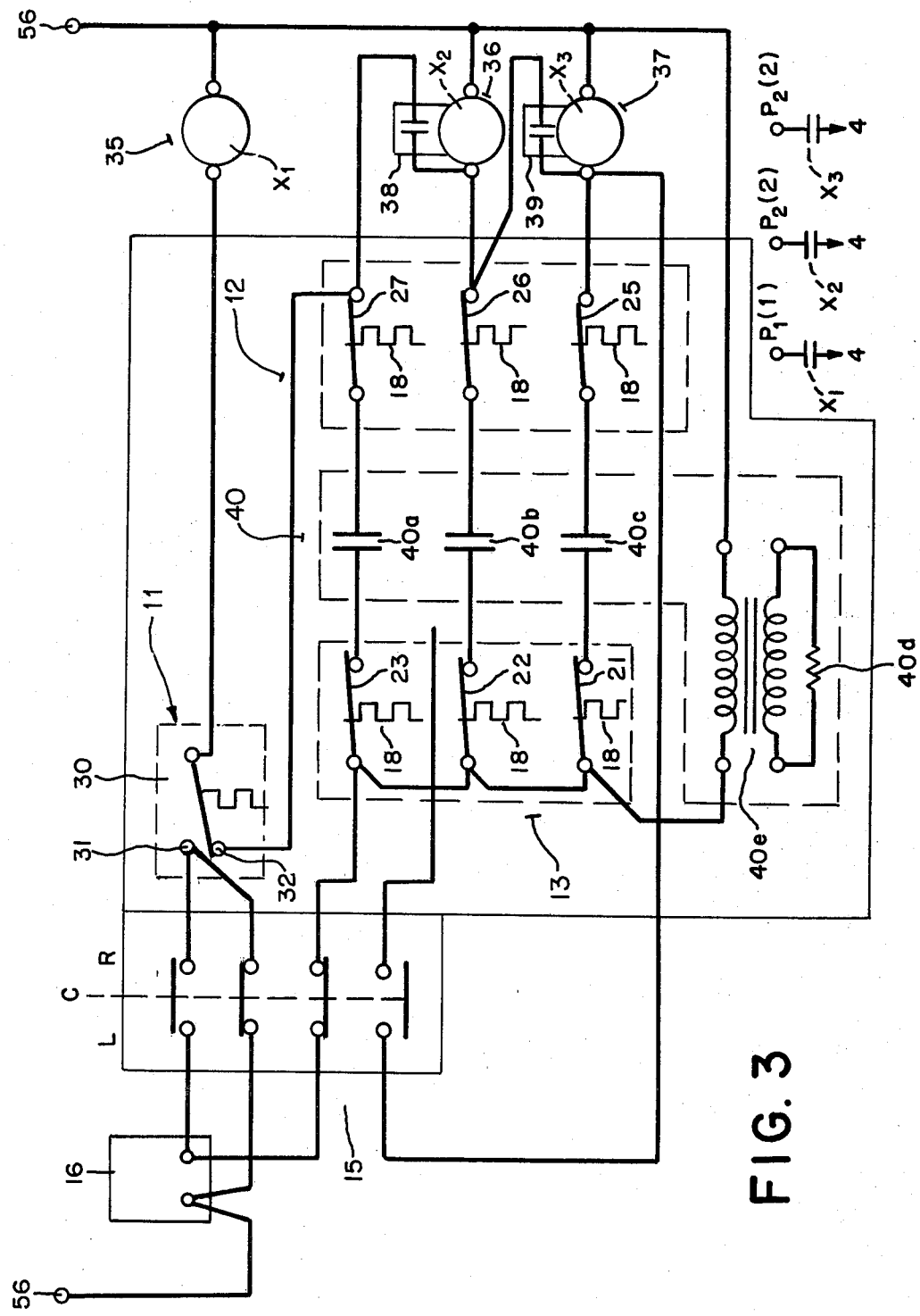
FIG. 3—Circuit diagram of a 3 stage controller.

The following refers to FIGS. 1, 2, and 3, that is with a controller operating in the system shown in FIG. 1, wherein the controller 1 is an embodiment having the dial arrangement of FIG. 2 and circuitry according to FIG. 3, and the selector 14 in the winter position. A particularly novel feature of the invention lies in the utilization of three temperature "spans" for the temperature sensitive elements generally indicated as 12 and 13 in FIG. 3.

In the exemplary but not exclusive embodiment disclosed, the total temperature range of 12 and 13 is divided into three segments or spans as are the power levels P1, P2, and P3 indicated in FIG. 1.

This is accomplished by energizing contactor coils 35, 36, and 37 through thermally actuated contacts 21 27, and associated power contacts 41, 42, and 43, thus energizing heating elements 4 at discrete power levels P1, P2, and P3, from line source 56 or other suitable electrical supply. Sequence controller 40, not a part of this invention provides regulatory time delays in applying power to the heating elements 4. In operation, contacts 40a, 40b, and 40c are mechanically actuated by electrical heating of thermal element 40d, after voltage is applied to the primary of transformer 40c. In this way delays in energization and de-energization of the heating elements providing power inputs P1, P2, P3 are achieved. Delay intervals, however, associated with this controller are aimed at minimizing light flicker and line voltage variation, are short in duration and the controller is only included in the disclosure only for the sake of completeness.

In the instant case, if the operating or ambient temperature range of 12 is 35° to 70° F. for a dial setting of approximately 30° F., this span of 35° (i.e., temperature set points for switches 27, 26, and 25 or 70°) (start to span), 59° (ambient plus two-thirds span), and 47° (ambient plus one-third degrees Fahrenheit respectively. Switches 25, 26, and 27, are actuated sequentially by the thermal element of switch 12 opening at temperatures above their setting, and closed below. Similarly, given a range of storage temperature for 13 of 170 to 290 degrees, three storage limit setpoints of 210, 250, and 290 degrees Fahrenheit are provided. The power levels of 6 kilowatts, 12 kilowatts, and 18 kilowatts, i.e., increments of 6 kilowatts are also exemplary only and represent more or less typical heat losses of the structure having a thermal performance indicated in FIGS. 4, 5, and 6.

It should be noted that although the disclosed embodiment employs temperature sensitive elements 11, 12, and 13, having thermostatic actuating elements 18, and temperature setting dials A, B, and C, utilizing thermostatic switches operating in preset temperature ranges, many other devices could be used to provide similar functions. These would include temperature sensitive resistances, operating in conjunction with electronic apparatus providing electrical signals indicative of the various temperatures.

In operation, assuming that the timer 16 providing electrical power from line source 56 thru internal contacts at preset power-on and power-off intervals, has gone through a power-off period, at the end of that period, the selector 14 is enabled and as will be described below, depending on the conditions of the controller elements, power draws of 6, 12, and 18 kilowatts are initiated. For the case disclosed, assuming that the outside or ambient temperature is less than 47 degrees, with contacts 25, 26, and 27 closed, and the temperature of storage 3 as measured by the thermal element 18 of 13 is less than 290° and greater than 250° F. with contacts 21 and 22 open, and 23 closed, contactor 35 would be energized via the high contact 32 of 11 since the thermal element of 13 and associated contacts 31 and 32 are set to close 31 and open 32 above a predetermined minimum storage temperature, i.e, 180° F. Contacts 23 and 27 respectively of switches 13 and 12 now supply six kilowatts of power to storage. This condition is indicated at the location 45 of FIG. 7. Selector 14 provides circuit changes for reduced storage and/or non-space heating operation, and are not a part of the disclosed invention. As disclosed, the controller is functioning in the maximum storage or winter position.

In the event that after the power-off period, the ambient or outside temperature 0.5, of the structure being heated as measured by the thermostatic element of controller 12 is again below 47 degrees, and therefore contact 27 is the "closed" position, and the heat draw, or heat removed from storage was such that the storage temperature as measured by the temperature sensitive element 13 of controller 11 was below 250 degrees, referring to the circuit of FIG. 3, it can be seen that contact 22 and 23 would now be in the closed position allowing energization of the additional contactor 36 providing a second increment of power. At this point, P1 and P2 are "on" drawing 12 kilowatts of power from utility lines.

Figure 7:
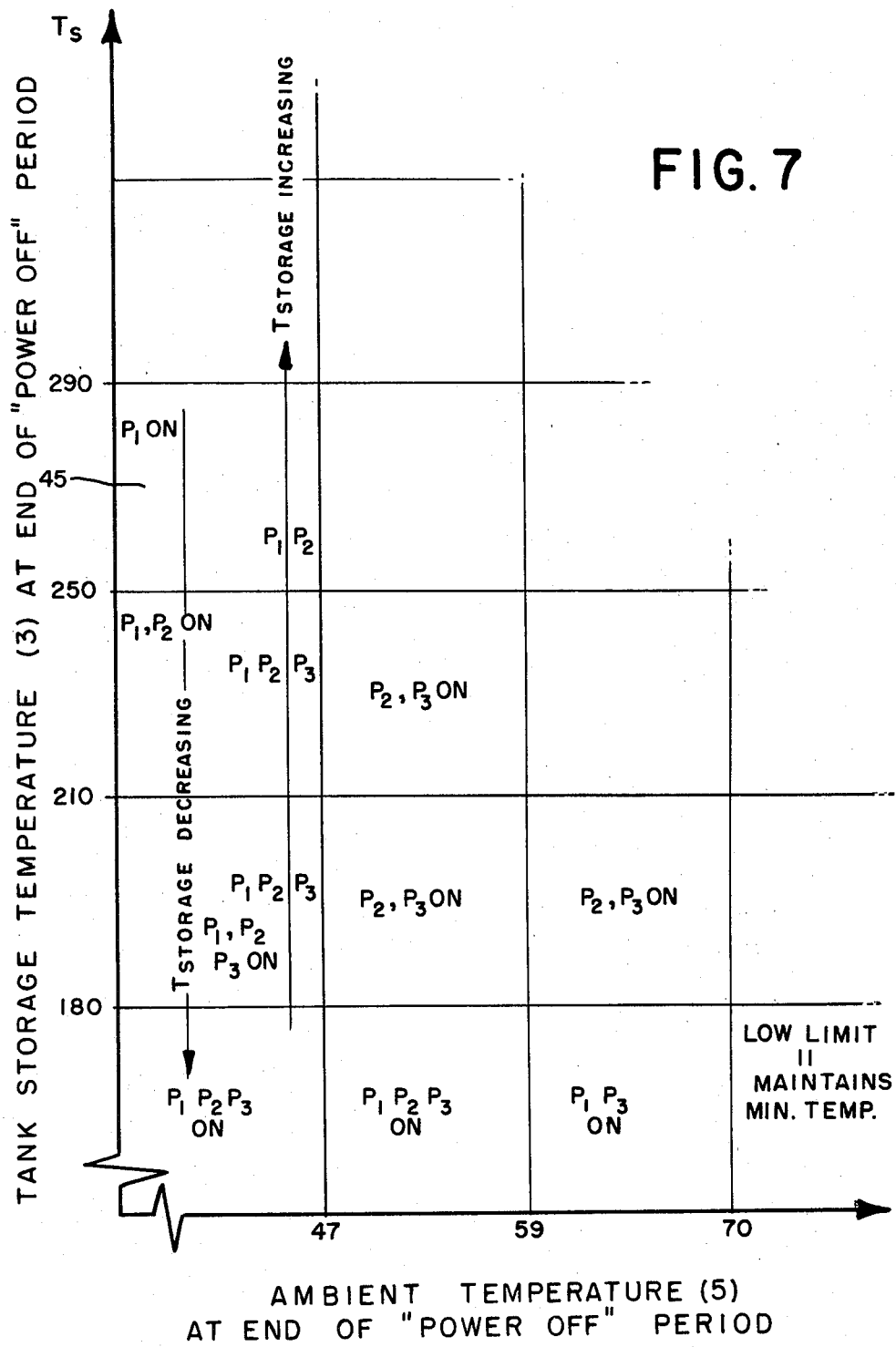
FIG. 7 is a graphical representation of the power ambient temperature relationship for the disclosed embodiment of the invention showing functional relationship between storage, and ambient temperatures, and level of power input to the heater.

It should be noted that due to the action of the interlock or "stick" contact 38, a normally open contact actuated by coil 36, as heat is stored and the temperature of storage increases, it will be necessary to exceed the temperature of contact 22 and 23 of thermostat 13, before the electrical energy controlled by contactor 36 is interrupted. This feature provides a margin of safety and provides essentially increased sensitivity to temperature drop of the storage as opposed to temperature rise. Those skilled in the art will notice that a similar interlock or "stick" contact 39 is provided which requires that storage temperature, once having dropped below the setting of contact 21, rise above the contact temperature setting of 23 before power draw is reduced. As those skilled in the art will additionally notice, a controller can, as described above, provide varying power draw as shown in FIG. 7 for various combinations of ambient temperature and residual storage temperature at the initiation of the "power-on" period.

Figure 4:
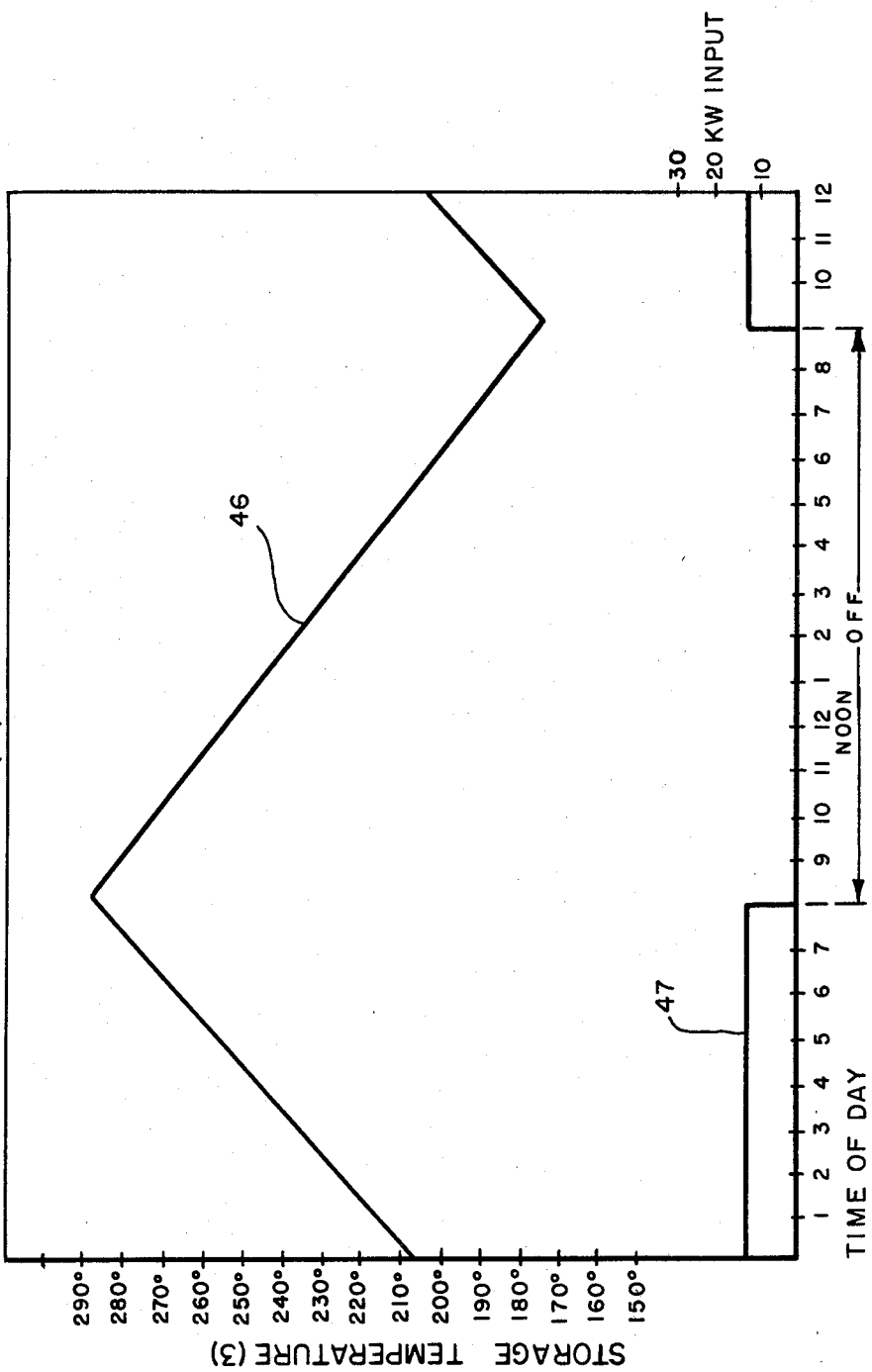
FIG. 4—Time/storage temperatures diagram of a typical application such as shown in FIG. 1 wherein the heated system is a dwelling or similar structure.
Figure 5:
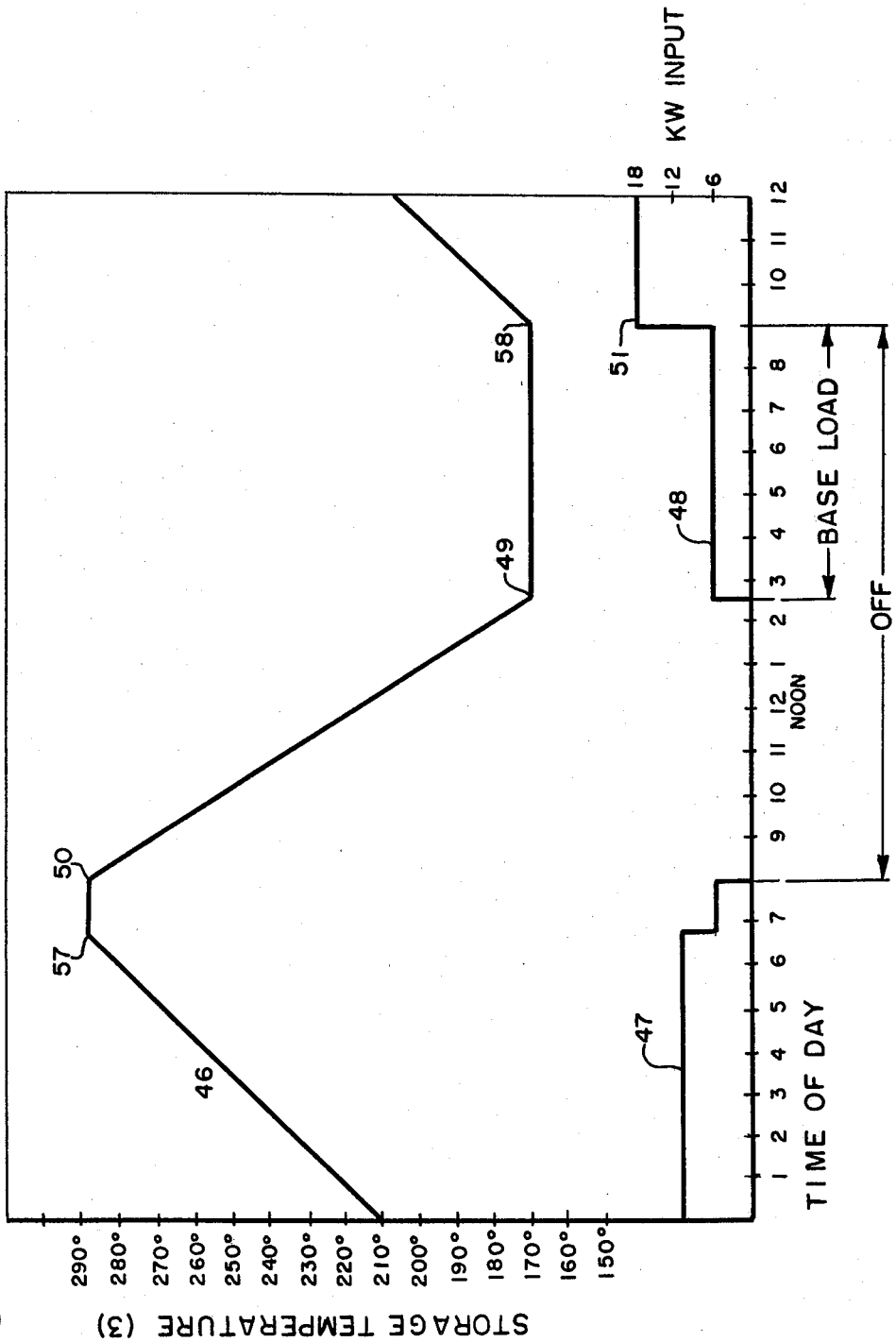
FIG. 5—Time/storage temp diagram of the system of FIG. 4 at a different ambient temperature.
Figure 6:
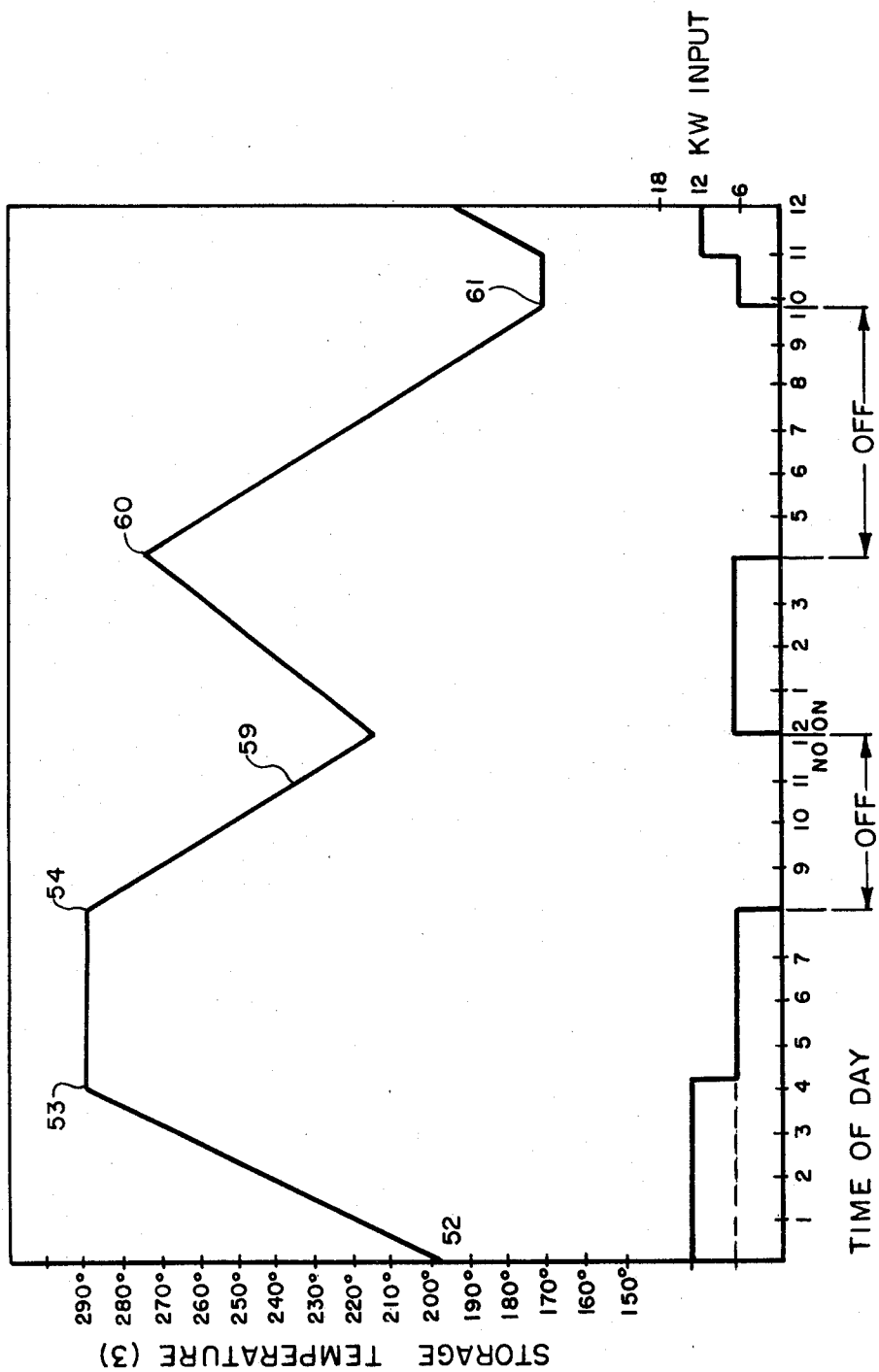
FIG. 6—Time/storage temp diagram of the system of FIG. 4 at another ambient temperature.

In further reference to the above controller action and FIGS. 4, 5, and 6, it can be seen that operation is such as to either eliminate or greatly reduce the initial power draw from a plurality of stored energy heaters at the termination of the power-off period. More particularly, in reference to FIG. 4, where heat or storage temperature 46 and total heater power draw is shown at 47 over a 24 hour period, it will be noted that the storage period from 9 P.M. to 8 A.M. provides sufficient stored heat to satisy load requirements over the succeeding power-off period from 8 A.M. to 9 P.M. As indicated in FIG. 4, the controls 12 and 13 are set at 35 degrees and 170° F. respectively. As discussed above, switches 25, 26, 27, and 21, 22, and 23 provide an ambient span of 35° to 70° F. and a storage temperature span of 210° to 290° F. respectively. It should be noted that the ambient or outside temperature 5 (ref. FIG. 1) is as indicated, 35 degrees.

In reference to FIG. 5, which is as the above discussed system, a controller, load and heat input as shown on FIG. 1, having control settings identical to those of FIG. 4. However, in this case, the load operation is in an ambient or outside temperature of 5° F. The resulting increased heat loss, due to the lower ambient temperature, results in the tank storage temperature falling below the minimum temperature as set by controller 11 and switch elements 30, 31, and 32. Therefore, as indicated in the wiring diagram of FIG. 3, when the contact arrangement 31 and 30 are enabled, i.e., the storage temperature having dropped below the minimum preset value, the time clock is essentially bypassed, energizing contactor 35 and applying the minimum input to the storage and providing a "base load" 48 of 6 kilowatts during the power off period, the base load temperature is shown on FIG. 5 at point 48.

This feature provides heat input to storage and load on the utility which allows a pre-determined minimum level of power to be supplied to loads in the event of a sudden or unanticipated demand, such as very low temperatures, high wind losses, and the like. Note that at point 51 as the power on period is initiated, the controller establishes the maximum power draw of 18 kilowatts.

In further reference to FIG. 5, point 57 indicates that the storage temperature had reached its maximum prior to the end of the power-on period at 8 A.M.

Under these conditions the actions of the control 13 through its contact 23 provide an upper limit at the preset temperature of 290° as indicated at 48 and 50. The horizontal line between 48 and 50 is only a representative approximation of the actual storage temperature. Similarly, the horizontal line between 49 and 58 is also a representation and would involve small temperature swings around the minimum temperature of 170 degrees having a frequency and amplitude dependent on the existing load at the time.

In reference now to FIG. 6, as above, the system is as shown in FIG. 1. However, the storage temperature setting has been reduced to 216° setting and the ambient temperature is a 5° F.

Also, the ambient restriction switch or controller is set at 5°, providing span temperature of 5° F., +20° F., and +45° F. These adjustments are necessitated by a dual off period requirement, i.e., 8 A.M.-12 noon, and 4 P.M.-9:45 P.M. (ref. FIG. 6).

Adjustments in span, achieved as indicated above, are required to insure sufficient heat storage in the now decreased "on" period and reduce the "secondary peak". This is accomplished through establishing a minimum storage temperature which will be reached at the "design load" in this case 216° F., determining new spans of 290°-274°/3°-25° F. and establishing switch points of 216°, 240°, and 256° F. respectively.

Under these conditions the span adjustments result in energizing the first, second, and third levels of power draw at storage temperatures below 216°, 240°, and 256° F. respectively. Therefore, it can be seen that adjustment of the storage temperature reset limit, i.e., control 13 and its associated contacts, results in increased or decreased sensitivity to the remaining storage temperature through a reduction in the magnitude of span temperature.

Similarly, increased sensitivity to ambient temperature changes is obtained through adjustment of the ambient power restriction limit 12 and its associated switches 25, 26, and 27.

This is accomplished by setting switch 12 to 5° F. and adjusting the "spans" as indicated above to +20° F., and +45° F. Broadened ambient spans provide greater sensitivity to the existing ambient temperature, and provide earlier shut-off at increased ambient temperatures resulting in greater reduction of secondary peak loads at 12 A.M. and/or 9:45 P.M.

In further reference to FIGS. 4, 5, and 6, particularly to the relationship between indicated power levels and storage temperatures, it should be noted that indicated values are "representative" and not exact representations of quantities in any specific situation.

Those skilled in the art will realize that it is impractical to show the experimental functions of varying time constants provided by changing heat inputs and demands. Similarly, the power levels and storage temperatures are "average" values and do not necessarily relate to the temperature/switch points at a given time during the "on" or off periods.

Exemplary of the above are (ref. FIG. 6) points 52, 53, 54, 59, 60, and 61. These represent "typical storage" temperatures during "power-on" and "power-off" periods for an additionally "typical" demand on load extracting heat from storage.

Alternate embodiments of the controller disclose systems employing microcomputers in achieving further improved control of stored heat in individual heater installations. Frequent and cyclic measurements and determination of pre-determined factors influencing amounts of storage, temperature levels and rates of heat withdrawal are performed. These factors are then utilized to adjust storage heat inputs so that adequate heat is available, while reducing and/or controlling maximum electrical demand, improving heater thermal efficiency, and increasing component life.

Figure 9:
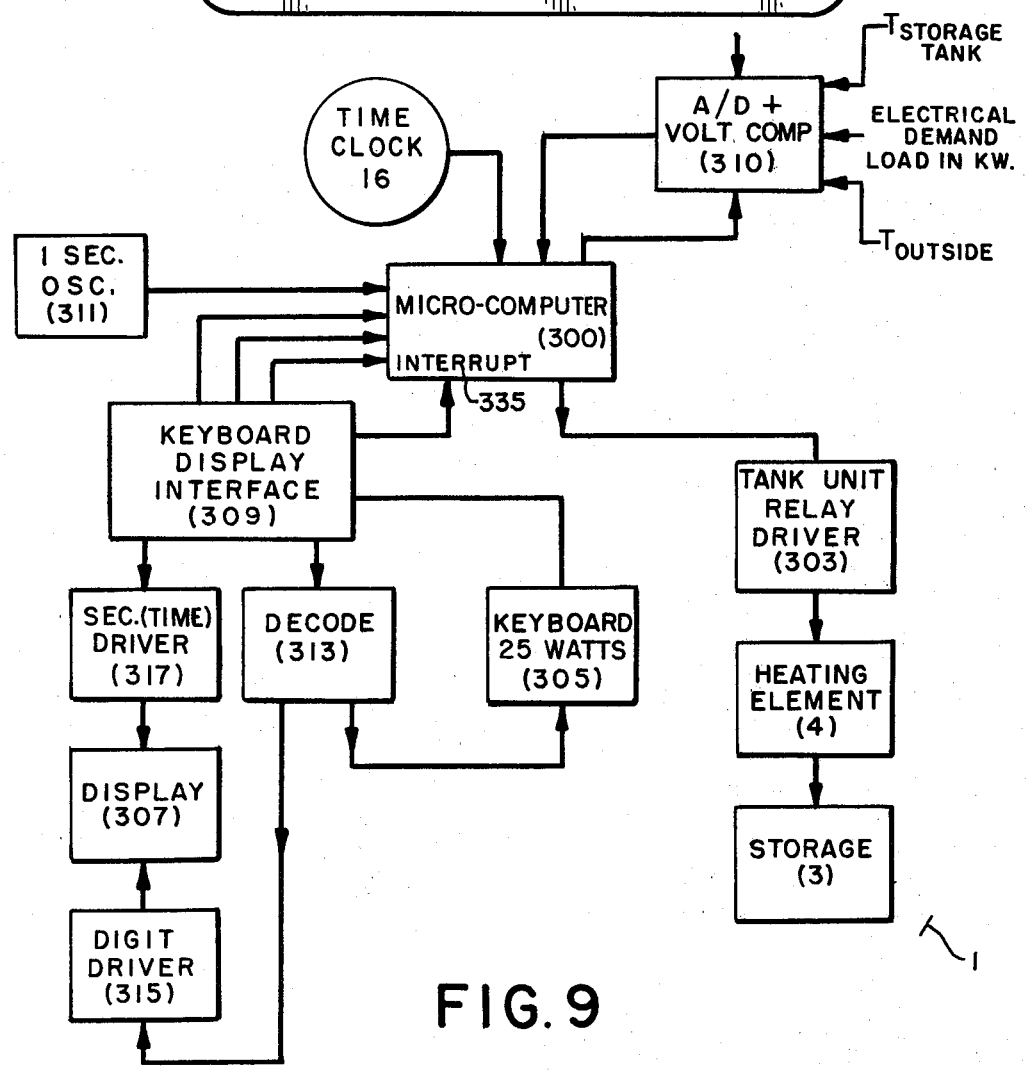
FIG. 9—The functional semi-schematic diagram of the controller system of the invention showing signal flows keyboard and interfaces devices salient to operation of the disclosed alternate embodiment of the controller 1.
Figure 10B:
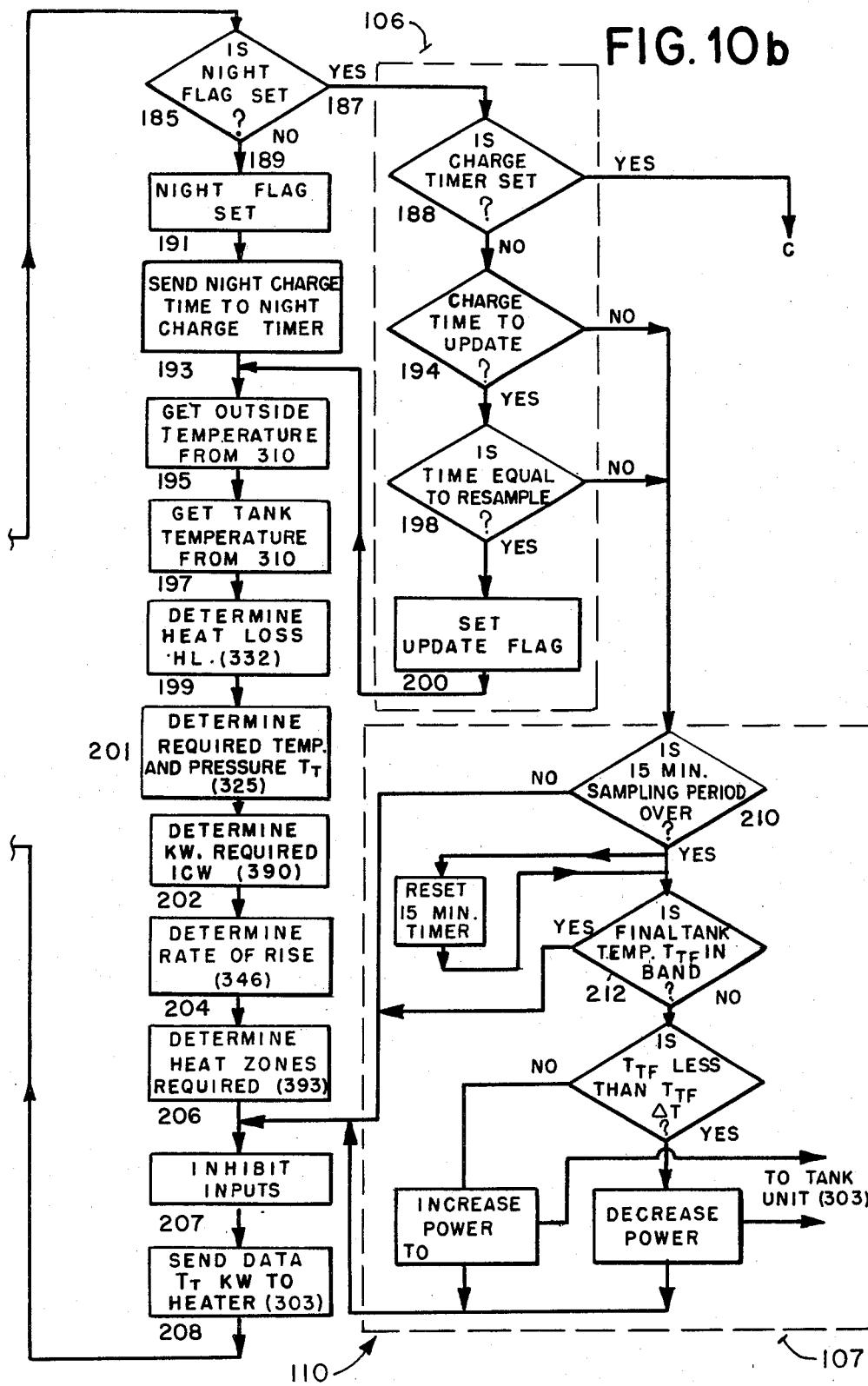
FIG. 10 (a and b)—A functional flow diagram indicating operational programmed steps performed by the controller described in FIG. 9 above including references to line instructions contained in the microprogrammer operating routine. Interfaces with the external keyboard, display, and stored energy heater are shown.
Figure 11:
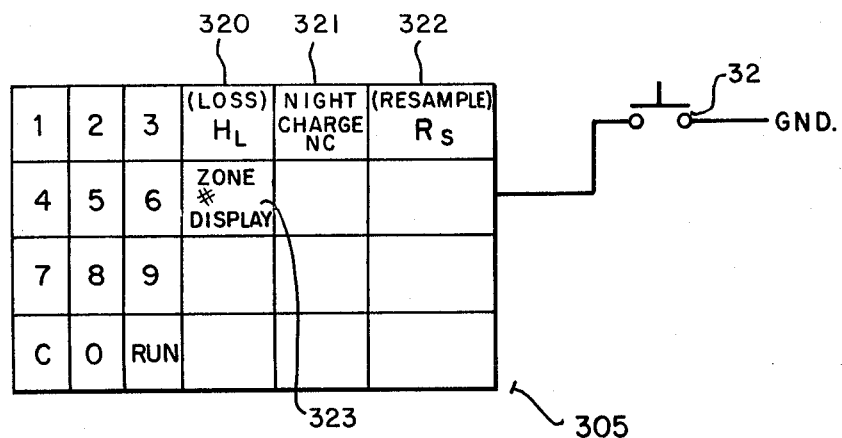
FIG. 11—Functional semi-schematic representation of the keyboard contained on a keyboard input device for use with controller of FIG. 8.

Operation of the first alternate embodiment is best understood by reference to FIGS. 9, 10, and 11. With particular reference to FIG. 9, a microcomputer 300 coacts with an external power demand time clock 16, and associated components including a one-second oscillator 311 supplying a one second pulse, which establishes the time base of operation for the micro-computer 300 in supplying power to heater elements 4 during predetermined "power-on" periods (ref. FIG. 5). An analog to digital converter 310 interfaces external inputs including external temperatures T (external or outside) and T (storage or tank). Those skilled in the art will understand that these external input quantities are furnished in the form of continuous or analog voltage levels and converted or encoded for processing in the microcomputer 300 by the interface 310.

In the preferred but not limiting configuration disclosed with particular reference to FIG. 9, the microprocessor 300 utilized is manufactured by "INTEL" model 8048. Those skilled in the art will find that other micro-processors will function equally as well when programmed to achieve the functions disclosed herein. Programming the INTEL unit is accomplished through establishing a series of hexadecimal (HEX) commands. The commands or instruction set are arranged to provide the functional operations disclosed in FIGS. 10a and 10b, cooperating with the interface components shown on FIG. 9.

Although the HEX instruction set is not a part of this invention, and therefore does not accompany the disclosure, those skilled in the art will find detailed instructions, descriptions, and programming information contained in INTEL's manual 98-004C or equivalent. Applicant submits that the micro-processor programming required to accomplish the inventive concepts disclosed in this application are well known to those ordinarily skilled in the art and therefore the HEX command details need not be included.

Figure 8:
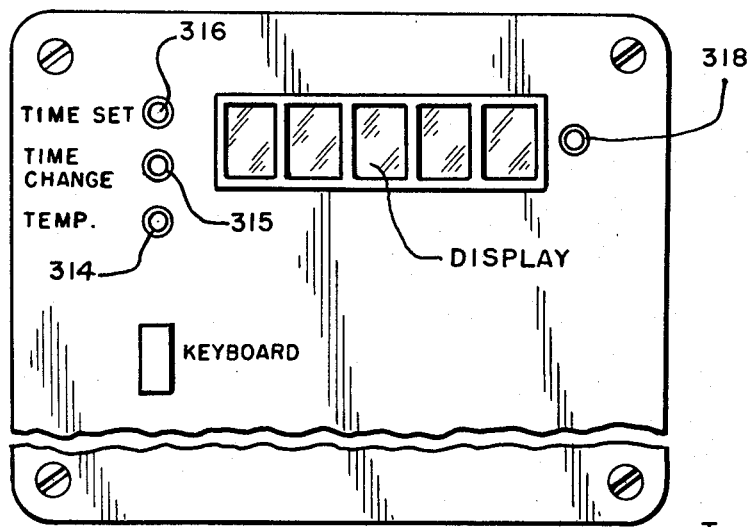
FIG. 8—Front view of panel including display of the alternate embodiment controller.

Also, cooperating with the micro-computer 300 is a keyboard display/interface 309 (INTEL 8275) further acting through a decoder 313, and digit driver 315 to operate the display 307. It should be noted that the physical configuration format of the display incorporating four decimal digits of the liquid crystal (LCD) or light emitting diode (LED) type also includes an individual visual indicator 318 (ref. FIG. 8). Indications and/or identification of the specific readout shown on display 307 for operation of push button switches 314, 315, 316, and indicator 318 is as follows:

314-temperature readout either ambient, storage or other an external input value. When depressed once in a 10 second period, temperature of the storage 3 as measured during the last sampling period will be displayed for approximately 10 seconds. If 314 is depressed twice in a 10 second period the ambient, (external, or load) temperature sampled at the start of the most recent power off period will be displayed for 10 seconds.

315 and 316 provide readout and setting of the clock contained in the controller. When button 316 is pressed once, powers digit will be displayed, and can be reset from the change button 315. During this operation seconds are reset to 00. If 316 is depressed a second time, i.e., sequential to the first depression, minutes will be displayed and new values entered from button 315 to be described below. When either of the above operations has been performed, depressing 315 provides increments of either minutes or seconds on each depression. Therefore, minutes can be advanced from 00 through 59 and hours from 00 through 23.

318-is a conventional auxiliary circuti for detecting low output voltage of a controller. Energization of light 318 signals need for battery replacement. Use of battery provides freedom from utility power pulsations and/or outages, making it unnecessary to reset controller constants and stored information after loss of power.

As shown in FIG. 9, the micro-computer outputs operate a relay driver located internal of the heater tank unit 303, which in turn adjusts heating elements 4 for proper power input to storage. The approach to determining appropriate power input will be described in some detail below in reference to "power on" 02 "night charge". Additional description of the technique is contained in U.S. Pat. No. 3,423,598, hereby incorporated by reference.

With reference to FIG. 11, the keyboard 305 utilizes conventional digit push buttons as inputs for entry of digits zero through nine including Clear and Time commands. The keyboard further includes specialty command buttons, which on actuation provide readout and-/or updating inputs to the controller of the following quantities (Ref. FIG. 13):

CLEAR this command removes any immediately prior date of entry. Operation of the CLEAR command blacks out the display for 10 seconds after which, assuming no additional command is introduced, the time of day returns to display 307.

HL (334) A quantity computed from predetermined value of heat loss requirements for the dwelling design, and a specific ambient temperature.

H1 (320)-This quantity is an estimate of the current heat losses of the load based on adjusting the above mentioned HLi, usually determined at 0 degrees Fahrenheit, for the ambient temperature at a predetermined time of day. This operation, therefore, provides an updated value of ongoing heat requirements, adjusting for changes in the output or load temperature. If depressing the keyboard Hl is preceded by two digits, the digits will be entered. The time of day of this entry will be displayed during entry. If the Hl command is used preceded by the CLEAR command, a previously stored value of Hli will be displayed. The updated value Hl is, in the preferred embodiment, not displayed since it is an intermediate quantity utilized in determining the displayed quantity "ZONES ON" (323), to be described below.

NIGHT CHARGE

NC (321) This quantity indicates and begins with the end of the power off period, or conversely beginning of the power on period. Keyboard entry of a particular night charge time, i.e., 0–24 hours, is achieved by preceding actuation of the night charge key by desired two digit time of day. As in Hl above, if actuation of the night charge key is preceded by actuation of the CLEAR key, the present, i.e., previously entered beginning of the power on period, will be displayed. It should be noted that (Ref. FIG. 13-323) the value t (charge "on time" 321) is the value of night charge in hours.

RESAMPLE TIME

RS (322) This quantity establishes a time interval within the permissable "power on". As indicated in FIG. 10b at 198, at the resample time, the ambient or load temperature t (out) 329 is measured at 195. Using this now updated value of outside or load temperature beginning at 193 of FIG. 10b, all values of heat requirements, and estimated heat losses are recomputed in order to readjust tank storage inputs. Typically, two resample computations are performed during the night charge (power on) period, the first on initiation of power on, and the second at the end of the predetermined night charge period.

ZONE:

(348) provides indication of the amount of heat being supplied to the storage 3 from elements (4), when heater is in a "power-on" period.

The controller panel (Ref. FIG. 8) contains time set pushbutton 316 and temperature read pushbutton 314 and 315 as discussed above. Operation of these in conjunction with the micro-processor 300 will be further discussed below.

Figure 12:
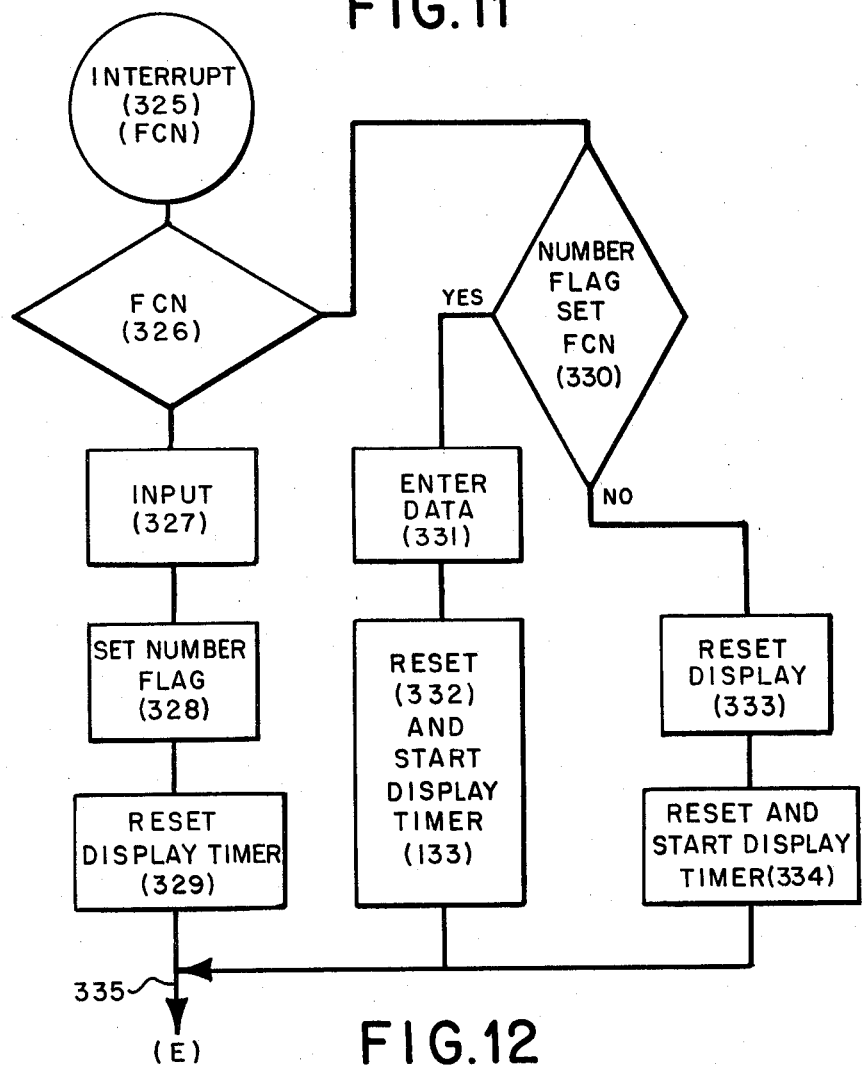
FIG. 12—Program diagram of interrupt associated with operation of keyboard shown in FIG. 11.

In FIG. 11 the keyboard is shown in a functional semischematic diagram. The keyboard interrupt routine (Ref. FIG. 12) interrupts micro-computer 300 program cycle 105, 110 (Ref. FIGS. 10a, 10b) in order to allow an operator to either change, access, or readout a predetermined quantity. The functions of this interrupt routine will be described in broad details, since it is not a part of the disclosed invention, and is only disclosed for completeness. Operation is conventional and will be easily understood by those skilled in the art.

With reference to FIG. 12, at start (325) any key depression on the keyboard establishes or initiates the interrupt routine. At 326, the specific keyboard input is determined, based on the predetermined code, if a function (FCN) is present, i.e., indicating by depressing the CLEAR key followed by a specific quantity, the desire to readout either heat loss (320), night charge (321) or resample is indicated. To reset predetermined quantities if FCN actuation is preceded by two digits, Hl, NC, or RS will be entered and utilization in succeeding computation. These sequences at 330 select routes indicated by 331 or 333 respectively are chosen.

Assuming for example that a reset is desired at 331, it will be necessary to enter substitute or new data via the keyboard. This data is then processed at 332 and further displayed on 307. In the alternative, if only readout is desired at 333 the specific quantity is chosen from previous stored data within the micro-computer MC 300 and displayed at 334 via the UC program at 133. At 335, the particular command having been completed, program returns to control of the micro-processor 300.

Principal operation of the controller sequence contained in the micro-processor 300 is as depicted in the functional or operational flow diagram shown on FIGS. 10a and 10b. As indicated, this operation has three major and two minor portions; the "time set function" 102, "operational" 105, "system" 110, the resamle and tank update legs 106, and 107 respectively.

Beginning at the left hand side of FIG. 10a, the time set function is essentially a conventional digital clock having inputs as indicated from the pushbutton contained on the keyboard 305. As disclosed, functions of "time set" are essentially self-explanatory. Those skilled in the computer art will readily follow the conventional time indication and time set operations disclosed.

Returning now to the "operational" portion, 105 of FIG. 10, it should be first noted that 105 essentially operates on its own cycle receiving keyboard inputs and starting constants from the "system" 110. Time signals from the earlier discussed "time set" 102 enter at 135.

Beginning at 101, as indicated on FIG. 10a, all memory locations and internal timers are reset. The following description assumes that the micro-computer system disclosed in FIG. 9 has "powered up", all locations have been cleared and/or initialized, and all input data is available. Therefore, loop operation is enabled, resulting in ongoing control function as shown. Element 104 represents several 8 bit ports providing access, input, and information as follows:

a. Day-night inputs from the power-on, power-off period as determined by clock 16.
b. Push button time increments via keyboard 305, and switch 314 whereby the time of day can be set.
c. Digitized inputs from A to D convertor 311.
d. Keyboard interrupts, providing as indicated above, any quantities, desired readouts, or predetermined inputs.
e. Operating information from the controlled heater signifying power and predetermined temperatures.

At 106 if the time set key 316 has been actuated, controller operation exits at 107. In the alternative, assuming normal control operation is desired, the program exits at 109.

At 117 a check for day/night, or power-off/power-on periods respectively is conducted as determined by external clock 16. A heater power-on indication, i.e., a night charge period, would transfer control through 119 to either operation 185, while a power-off, or day indication continues on at 117. At 121, updated values of tank power settings as determined at the onset of the above mentioned night charge period are transmitted to the tank unit via operations 123, 135, and 127. It should be noted that if operation within the night charge period had exceeded or passed the predetermined resample time, the path 194, 198, and ending in 200 would have routed action through the succeeding loop 193 through 208 to recompute or update tank power requirements based on new external and tank temperatures as measured at the resample time.

The resample action, as indicated above, improves the estimate of tank storage required during the succeeding power off period. New tank storage requirements determined at the resample time enters the operational portion 105 at 125, updated information subsequently returning to the tank unit 303 at 127.

As indicated above and shown on 117, the "charge time" or night charge quantity provides a specific "power-on" period within that set by day/night or off-period/on-period timer 16.

At 123 all inputs are inhibited in order to examine tank temperature. At 123 the tank unit 303 is reset to adjust existing tank temperatures, and the tank unit is updated via operations 125 and 127. At this point if no new values were computed, functional loop cycling is employed primarily as a means to allow changes in input data, or information readout if required on command from the keyboard. Turning now to the resample leg 106, at 188, had the resample period been exceeded, computations would have proceeded via 188 through 200, 191, and 208 to provide recent information for adjusting tank power input. In the alternative, had the resample time not been exceeded within the power on or night charge time, computation would proceed to the tank update leg 107 beginning at 210.

The tank temperature update loop provides frequent checks of tank temperature which with those skilled in the art will understand is a primary indication of past demand. In the disclosed embodiment tank temperature is updated each 15 minutes. Computation 212 compares the most recent tank temperature with a value obtained by adding Delta T, a value obtained from relationship 346 (Ref. FIG. 13) to the measured tank temperature increase.

The computed tank temperature Delta T assumes a zero demand from storage rise in storage temperature during the preceding 15 minute or like period within the night charge internal (NC). If the final tank temperature exceeds the computed value, no power adjustments to the tank or storage are made and computation proceeds to 206 via 212. However, in the alternative, should demand on the storage reduce tank temperature below the predetermined value, at 214 the existing tank temperature is compared with a value obtained from the sum of the existing tank temperature and the expected increment determined via 346.

If comparison at 212 and 214 indicates that tank temperature has exceeded the expected increment at 216, power to the tank unit is decreased by a predetermined increment. In the alternative, if actual tank temperature is less than the above actual plus expected increment power is decreased. In each case after the tank power has been adjusted, computation proceeds at 207.

With regard to adjustment of the input levels of heating element 4, resulting from the above 15 minute adjustment a fixed increment of one integral unit is provided at 216 or 217. As indicated on FIG. 10b at 206, the tank update leg 107 bypasses the computation at 201, 202, 204, and 206, wherein integral plus fractional power input levels is determined. As indicated earlier the fractional adjustment is established in conjunction with the night charge period, initially at the onset of the power on time and once more at the resample time.

Determination of a precise value of heat input enabling increases and decreases at 216 and 217 at the heater 4 is accomplished by an operation indicated (Ref. FIG. 13) as 348. In this typical, but non limiting operation, a power value determined by 321, that is the number of kilowatts required to recharge the tank given a specific charge time and loss, is divided by the integral number of heating steps available in a particular heater. In the disclosed embodiment six heat levels are available. Therefore, division of the required kilowatts by 6 indicates the number of integral zones energized, and the fractional difference rounded to 10/ths is adjusted to provide required heat input levels to the nearest major increment plus 1/10 of a major increment.

At 127 (FIG. 10a), all interrupts are again enabled and updated power commands are sent to the relay drive (303). At 129 a routine check for adequate controller battery voltage is conducted. At 131 a ten second timer is utilized to display on keyboard command, all previously entered data, i.e., keyboard command inputs, previously stored information such as tank temperatures, ambient temperatures, and heat levels or zones, and the time of day for 10 seconds. Note that in the 135 to 137 portion of this program keyboard data is transferred to display. Similarly, at 139 the readout obtained from the time set 102 is transferred to the display under control of the program. More detailed description of matrix and display operations of this type are disclosed in a publication-"Scientific American" dated March, 1976.

Proceeding to the "system" portion 110 of FIG. 10b, and more particularly the resample leg 106, at 185 a check for power-on or power-off is conducted. Note that in the case of a "night flag" indicating the start of night charge, or "power-on" and exiting through 187, the night charge timer 188 accepts inputs from the keyboard if present and/or entered through the keyboard interrupt. Also, all computation of heater system values conducted in controller action from 195 to 208, utilize computational expressions shown in FIG. 13.

At 198 and 200, a night flag or indication is set at 193. Any data input from the keyboard is transferred to the night charge timer 188. At 195 and 197 outdoor ambient temperatures, and storage tank temperatures are accepted from the A to D converter 311.

Operation of the controller 1, particularly functions of the "systems" 110 from operations 199 through 208 are best understood by initial reference to FIG. 13, a list of computational approximations to various systems quantities utilized in the invention. More particularly, the computations shown on FIG. 10b, reference numbers 199 through 206 of the system 110 utilize these relationships, which are determined on a cyclic basis exiting the "operational" portion 105 of the controller at 119 and returning at 127. The relationships disclosed to determine final tank temperature Ttf (325), heat loss Hl(320), charge or power input Kw (323), heat zones "on" (348) and Delta T tank (346), comprise unique and novel relationships discovered by the applicant, and used in the disclosed embodiment. These relationships relate various functions of the heater and load and provide control of stored energy heaters, providing greatly improved operation, resulting in better utilization of equipment more economical operation, and more importantly, improved utility load management.

Generally speaking, the subscripts refer to the time dependent or preset value of the quantity for example. Ttf refers to final tank temperature required, determined for a particular ambient or outside temperature existing at the time of determination. Tti,Ref. 323, is a prior or initial value of tank temperature. Similarly, Hl is a value of heat demand or loss for the heated structure or process at a time subsequent to the requirement. Hli, is an earlier or initial quantity.

In FIG. 13, at 325, the tank final temperature in degrees Fahrenheit is determined. The value of final tank temperature (Ttf) indicates an estimated amount of storage required to provide heat and storage of a known capacity in a succeeding time period, assuming that the load or outside temperature in the case of a house, is the value t (out). It should also be noted that a minimum tank temperature of 140° is also assumed. Therefore, in a given situation for a t (outside, ambient or load temperature) of zero degrees, the required or final tank temperature of 290° would be computed or determined. In this manner it has been determined that it is possible to essentially predict the future storage requirements based on ambient temperature during the night charge (NC) or power-on period.

The quantity Hl (320) represents a current load correction for a prior computed value Hli, an estimated or predetermined initial heat loss for the heating load, i.e., a requirement at some specific time in the heater operating cycle. As shown, the initial value 334 is multiplied by a fraction consisting of the above mentioned constant 68 (degrees Fahrenheit) minus the ambient temperature 329 divided by the constant 68 degrees. The units employed result in a determination of the load heat loss in kilowatts establishing the magnitude and/or configuration of heating elements 4 utilized in the stored energy heater.

Quantity Kw (323) is an updated rate of heat input in kilowatts to be supplied by heating elements (4) to maintain a predetermined final tank temperature under the conditions of heat loss Hl (320) determined above for a particular time dependent set of heater operating conditions, in the charge time NC shown as T (night charge 321).

Again, non-limiting values could be; Ttf=290; Tti=180° F. The initial charge time would either be an "on" period from time switch 16, or as determined from charge timer 88.

A modified charge time can be entered via the keyboard. It should be remembered that, as indicated earlier, the quantity delta T (Ref. FIG. 13 346), is a linear estimate or prediction of tank temperature during the night charge period assuming zero heat loss and a predetermined power input. As indicated above, for a given amount of storage capacity assuming that the particular capacity is adequate to provide heat over a power-off period, tank storage can be assumed proportional to tank temperature. An additional assumption arises from the necessary condition wherein during the night charge period the tank is restored to its full predetermined capacity, again as indicated by tank temperature.

Therefore, given a final tank temperature of 290° and a minimum temperature of 140°, a temperature reduction of 150° can be expected during the power off period. Similarly, a temperature rise of 150° must occur during the night charge or power on time, assumed in the disclosed example to be eight hours or 32 fifteen minute time increments corresponding to the tank temperature update leg 107 interval (211).

Given the above assumptions, and turning to FIG. 10b, the computing loop 210, 211, 212, 214, and associated power decrease/increase operations 216 and 217, tank temperature is sampled during the night charge period at 15 minute intervals (380), and tested for deviation from an expected or predicted tank temperature increase delta T at 214. As disclosed, if measured tank temperatures in excess of an expected final tank temperature, i.e. the measured tank temperature plus the estimation delta T indicates heat storage at a greater rate than expected, a reduction in power is indicated at 217. In the alternative, a measured tank temperature less than the final tank temperature plus the estimated increase indicates that heat withdrawal is in excess of that estimated and an increase in input power for the remainder of the sampling period is provided at 216. It should be noted that the increments/decrements of tank input heat or power or in integral units of available input power, since the vernier and/or adjustment portion of the "system" 110 is bypassed by update leg 107 for this adjustment.

The above rate of change of tank temperature determined at shorter intervals than the resample loop described earlier provides a sensitive means of predicting ongoing heat demands within the night charge/resample intervals. As such, applicant has discovered that this novel approach to determination of the rate of change of tank temperature provides a additional anticipatory feature adding substantial refinement to prediction of heat requirements for a subsequent power off period, and perhaps more importantly contributes to insuring that adequate, and not deficient or excessive heat storage is maintained.

A shown, Reference FIG. 13, the relationship delta T tank utilizes heat tank final temperature (347), T tank measured (344), and a charge time interval (346), discussed above wherein fifteen minute sampling periods are utilized for a night charge time of eight hours. Application of the relationship 346 therefore provides an average or zero demand tank delta T of 5° F. during each 15 minute sampling period.

Relationship 348 determined the number of integral heating elements required to supply the above determined value of Kw (321) determined above. This value is utilized at program operation 206 (ref. FIG. 10). As shown, the number of heating elements is equal to the value of Kw (321) divided by a constant (352). In this case a typical value is 6 since six integral power levels are disclosed. However those skilled in the art will readily understand that depending on the size of the heating unit and number of elements many other integral numbers could be used. It should be noted that in most cases the computation will not result in an even integer. Therefore, as indicated at program operation 208 (ref. FIG. 10b), and 340 (ref. FIG. 13), any fraction of an integer determined in the computation indicated at 348 is rounded to the nearest 0.1, indicating tenths of an integral heating element. A look up table stored in the permanent memory of micro-computer 300 determined (at 206) a quantify representing tenths of an integral power unit is determined and supplied to the relay drive element 303.

Element 303 utilizes a dedicated heating element having a maximum capacity of one predetermined heating value which is controlled to supply heat to storage in predetermined fractions of the total heating element. Representative values of the embodiment disclosed in this application provide adjustments of 0.1 of a total heating element value or unit. This fraction is then added to the prior determined integer value from 348 to arrive at a controlled amount of input to the heater storage to the nearest 1/10 of an integral or single heating unit plus the integral number of elements for each succeeding 15 minute period. U.S. Pat. No. 3,423,598 discusses a typical method for achieving electronic adjustment of an individual dedicated element.

It will be further appreciated by those skilled in the art of controlling stored energy heaters that adjustment of the tank temperature utilizing rate of temperature change along with frequently updated information during a power-on period, provides heat storage closely matched or adjusted to the heat requirements of a succeeding power-off period.

Adjustments in heater performance provided through utilization of the above quantities in the sequence indicated above, i.e., in adjusting heater storage further provides adequate heat capacity without the necessity for overheating storage tanks through excessive heat storage, with attendant losses due to maintaining the storage at excessive temperatures.

Further advantage of the storage adjustment provided by the invention disclosed herein comes from the rapid reflection of changing demand in cognizance of a limited "on" or heat storage period. Thus, utilizing the principals of the invention, at the onset of a specific power-on period, accurate determination of subsequent requirements will result in minimizing the number of units in any given system which return to the line initially. Furthermore, the control disclosed provides for spacing out, or increasing the diversity of the demand of a number of such heaters on a given utility system, thereby reducing the so-called "secondary" or "shoulder" power peak on the utility.

At 199 heat loss is determined using the above captioned predetermined expression for Hli and Hl as indicated. The value of Hl or heat loss determined is an updated value as discussed above utilizing ambient load or outside temperature measured either at the onset of the night charge period, or at the resample time. Similarly, the quantity 323, i.e. Kw (charge) is determined utilizing the updated value Hl 332 and the quantity 325, i.e. Ttf the final tank temperature also discussed above. In this way the night charge power input undergoes major adjustments at the onset of the night charge period and at the predetermined resample time incorporating information on current heat loss through measurement of the outside ambient or load temperature, and the deviation of the storage tank temperature from an established predetermined value at the time of sampling, indicating past demand. In this way both current load, outside, or ambient temperatures, and past demand as a represented by the instant tank temperature are incorporated in order to insure storage of adequate heat for the succeeding power off period As discussed above, a further refinement on the Kw (323) is provided by the quantity delta T (346).

At 201 the required tank final temperature is determined as indicated on FIG. 13. At 202 the required heat input in kilowatts Kw to reach the final tank temperature is computed as indicated. At 204 an average rate of tank storage temperature rise 346 (T) is determined as indicated at 325 on FIG. 14. At 206, corresponding to the required heat input, an integral number of zones or discrete power levels 348 required is determined. At this point as discussed above, should heat increments varying from a single predetermined heat input increment or an integral "zone" be required, the proper fraction or percentage of said integral zone is determined at 206. To accomplish this, as discussed earlier, a table up look providing uniformly discrete, fixed power percentages comprising in total a value less than one integral zone or power unit is stored in permanent memory. At this point the proper power is transferred to 127 wherein on the next cycle of "operational" loop 105, power is transferred to the tank unit through 125 and heater contact drive 303.

Readjustment of the tank charge for resample periods is initiated at 188. Assuming that 194 a keyboard "RS" or resample input is present, the control proceeds to obtain an updated series of system and/or heater operating conditions via 195–208, 127, displaying this information at 307.

Figure 14A:
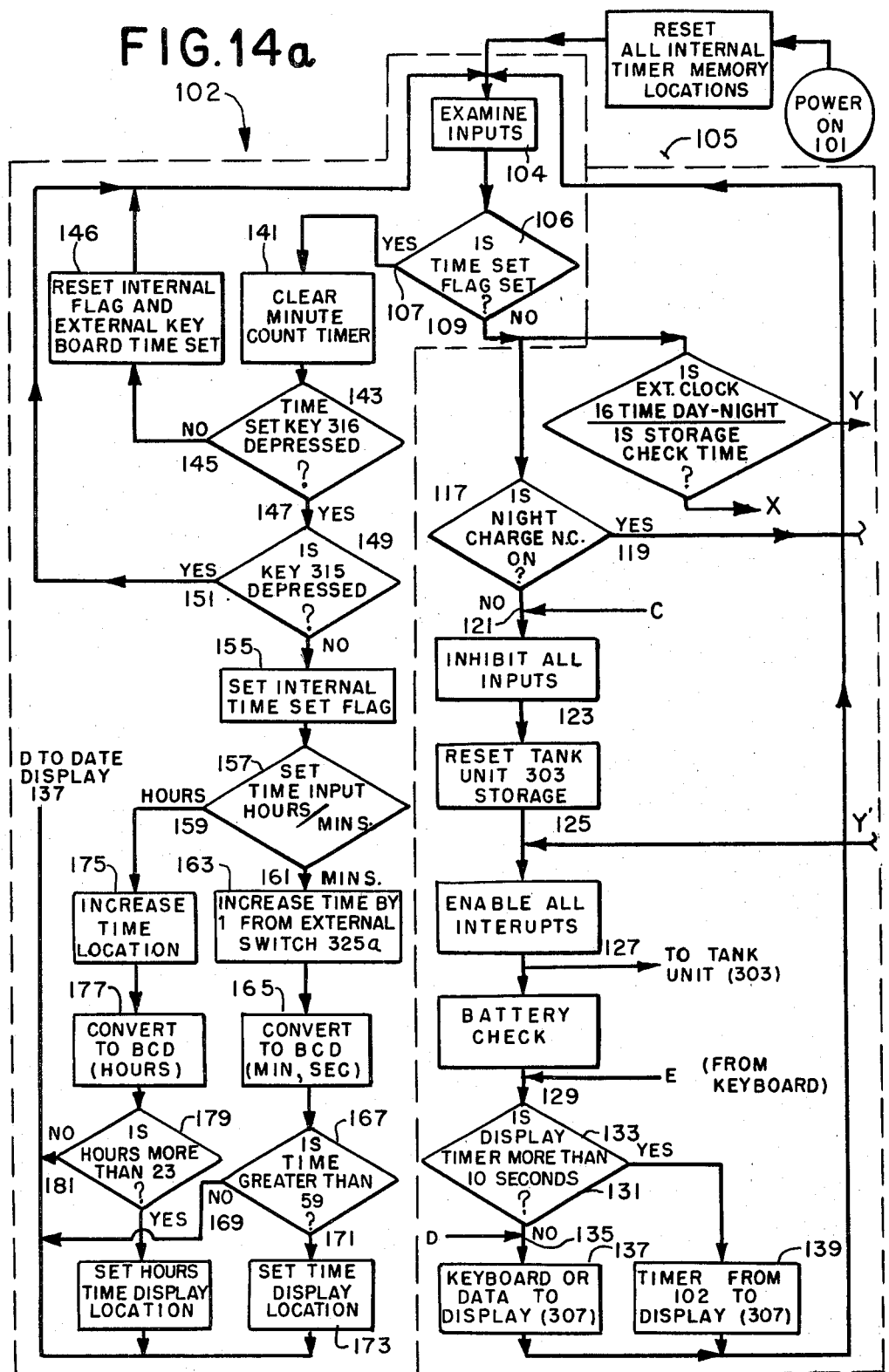
FIG. 14a is a micro-processor function and/or flow chart showing operation of the second alternate embodiment of the disclosed invention.
Figure 14B:
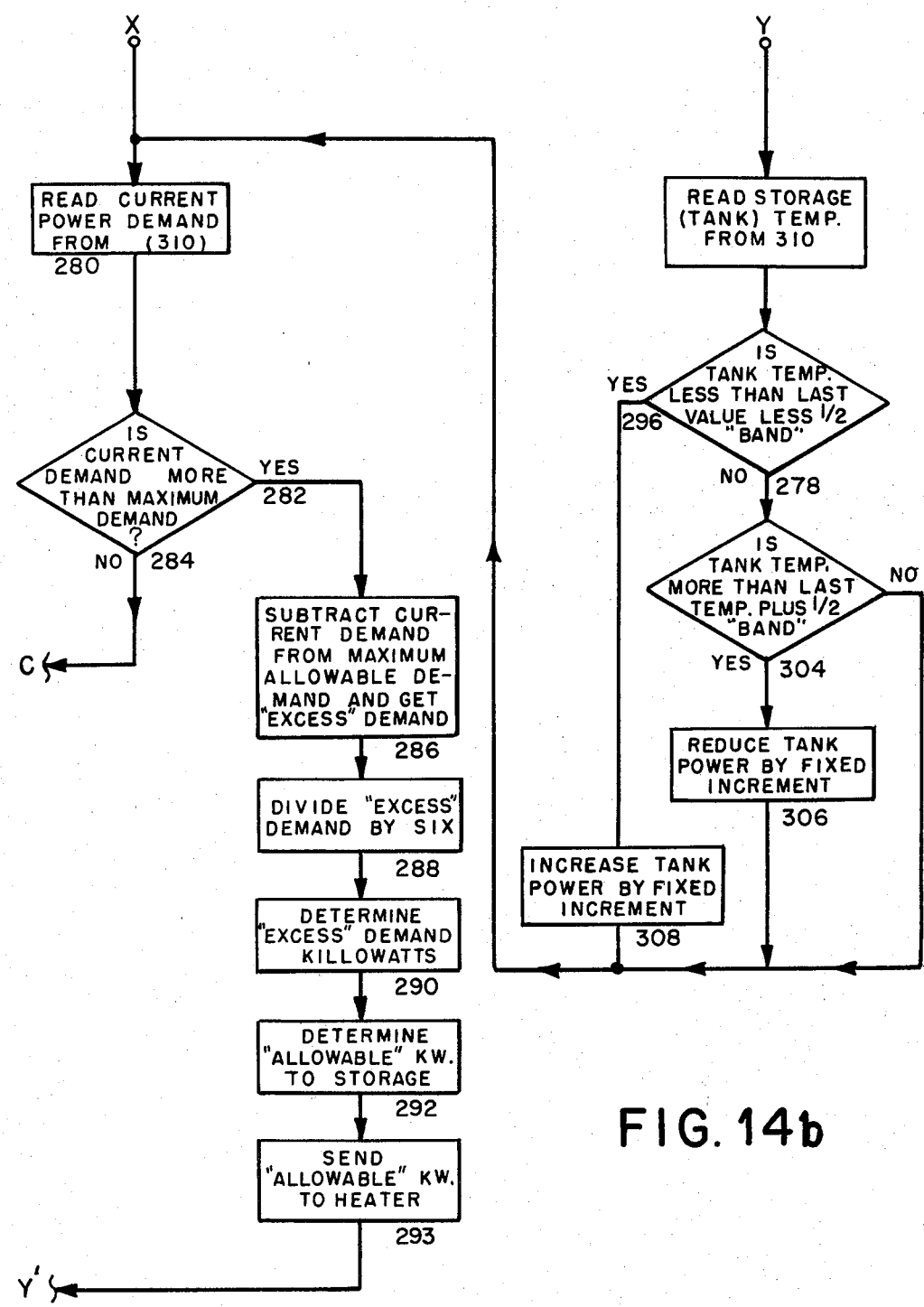

The second alternate embodiment of the invention will be described hereinunder with reference to FIGS. 14a, 14b, and 15. Other functions of the microprocessor controller have been described in detail above and in fact are disclosed in the above mentioned Figures utilizing identical symbols. The embodiment to be discussed here essentially begins on FIG. 14a at 275 where the external clock 16 signifying either power on-power off periods or a specific time of day wherein storage temperature is measured and recorded.

At 279, assuming that the system is neither in a power on period or at a storage temperature check time, processing continues at 280 where the ongoing electrical power demand, digitized at 310 (ref. FIG. 9) from the electrical demand input, is stored. At 283, the current demand is compared to a previously entered maximum value, exiting at 284 and returning to the main program at 121. This particular computational leg insures that the total electrical power demand is at or below the predetermined maximum at all times.

In the alternative, at 282, if current demand exceeds the maximum value at 282, the leg consisting of operations 286, 288, 290, and 292, determines the amount of over demand, and in a matter described previously determines the amount of load which will be shed or disconnected from the overall system to maintain demand within a predetermined maximum.

Control operation then proceeds to 125 of the "operational" portion of the main program wherein as described above operations 127 provides an update and adjustment of required heat input to the tank unit 303.

Returning now to step 275 in the event that either a power on period, or storage temperature sample or check time has been reached, at 294 the tank temperature is retrieved from the a/d converter 310. At 298 the present recorded tank temperature is compared to a value measured and stored at either the prior power on or tank temperature check time.

In the event that the current tank final temperature has exceeded the prior value by more than a predetermined amount or "band", at 298 and 300 the amount of excess tank temperature is determined, and at 306 a reduction in tank power is signaled. At 280 and 283 the now decremented tank power input is checked against the current demand returning to the program at 121 for any necessary adjustments in tank input.

In the alternative, if the tank final temperature is determined as having been less than the prior value minus a "band" value, tank power is increased at 308, with the now increased value checked against maximal allowable demand at 280 and 284.

It should be noted that in any case of demand exceeding a predetermined amount, the leg 286 thru 292 determines the amount of power decrease or load shedding required, and once again transfers the necessary information to the main program at 125 where computation proceeds until tank unit 303 is updated.

The values of maximum demand and kilowatts, tank temperature "band", and tank temperature compare point are as discussed above entered via the keyboard shown on FIG. 15. Modifications to the keyboard termed "tank control point and auto reset" function as follows.

Depression of the auto reset key proceeded by three digits establishes the incremental or decremental changes in tank input power as described earlier at 306 and 308.

If depression of the auto reset key is proceded by actuation of the CLEAR key, the demand limit utilized in 283 is increased by a number of kilowatts corresponding to any digits entered prior to operating the auto reset key.

The embodiment described above overcomes a difficulty encountered in operating stored energy heating equipment, particularly when a maximum overall demand, that is electrical input requirements of other loads plus the required heat inputs to storage are to be controlled. This type of operation encounters cyclic or regularly varying power requirements, particularly those due to heating. Relatively long term changes in outside ambient temperature in the case of a heated structure or other variations result in changes in storage requirements. If a maximum storage temperature is utilized at above described operation 297, during periods of relatively light demand, tank storage temperatures are excessive, resulting in increased heat losses to the ambient temperature.

On the other hand, reduced temperatures encounter shortages of available heat when the cyclic heating demand is in the increasing portion of the cycle.

This deficiency is overcome in the invention disclosed in this embodiment by monitoring tank temperature at a predetermined time, and/or at the onset of a power on period.

Existing tank temperatures are stored from day to day and a current tank temperature is compared with the value measured on the day or period preceding the instant measurement. It is, therefore, possible to detect relatively small variations in demand by effectively sensing the "rate" of change in heat withdrawal from storage.

It has been discovered by the applicant that this method provides a simple and economic means for substantially improving utilization of the stored energy concept.

As disclosed above, therefore, a method and controller for minimizing the "secondary peak" demand on a utility system has been provided. Operation of the controller involves utilization of readily available indications of the previous demand on a stored energy heating device through monitoring of its temperature at the onset of a power-on period. Further sensitivity to ambient or heat demand requirements reflected as controlling temperatures is provided through continuous measurement of a range of predetermined ambient temperature levels which in conjunction with the monitored residual storage temperature in effect predict the requirements for heat during a succeeding power-off period.

The invention disclosed allows continuous and adjustment of individual heaters so that individual load characteristics can be incorporated to control the power draw during the "power-on" period, and minimize the secondary peak at the period onset. Furthermore, the novel controller disclosed here in addition to the provision for "tailoring" a stored energy heater to its individual load incorporates a minimum temperature function, which in the event of a demand having low statistical probability of occurrence, will allow the unit to supply its load with a minimum or base load quantity of energy.

As indicated in the description of the load characteristic of FIGS. 4, 5, and 6, variation in individual storage and load demand can be obtained through adjusting the temperature sensitive elements.

As those skilled in the art of space heating will readily understand, the wide variety of environmental conditions, associated with geographically dispersed heating loads, such as house, hotels, and the like, results in a substantial variation in heat losses from system to system. However, if as discussed above, each individual heating system, having heat storage, when controlled in a manner which maintains that storage at a common and/or non-varying temperature, energy or power demands on the given utility source supplying a substantial number of such loads, will at the end of a "power-off" period, by subject to power demands from essentially all such system, regardless of the level of heat contained in storage at the time.

However, if each load is controlled in keeping with the invention disclosed herein, the level of each load and local ambient temperature will replace prior use, load characteristics, and the effects of local ambient conditions such as wind, sunlight, and the like. Therefore, individual demands, or loads controlled in a manner taught by the invention, will display a wide variety of reduced power draws on a utility system supplying a large number of heaters after a power-off period.

Therefore, the controller disclosed above in conjunction with a stored energy heater provides a diversified load which will greatly reduce the level of power drawn at the initiation of a power-on period, thereby reducing the above mentioned "secondary peak" substantially.

Thus, it is apparent that there has been provided in accordance with the above description, a method for controlling a plurality of stored energy heaters operating on a common power source such as utility electric lines which due to storing heat during periods of light loads, can be disconnected resulting in a reduction in peak energy demand, and further, eliminates the secondary peak load on the utility at the time of reconnection initiating a common "power-on" period. A controller has also been provided to augment the above method which utilizes highly reliable, commonly available devices to allow individual tailoring of storage and demand to each load in a manner which greatly reduces the statistical probability of a "secondary peak" at the onset of a power-on period, after a substantial common power-off period. Many alternatives, modifications, and variations of the above system and device will be apparent to those skilled in the light of the foregoing description. Accordingly, it is intended that all such alternatives, modifications, and variations be embraced by the spirit and broad scope of the following claims.

We claim:

1. A controller for a heating system having thermal storage operating within a predetermined range of storage media temperatures, from heat energy received during preset, cylic power on/off intervals, while continuously supplying varying system heat load requirements, comprising;

a heater having heat storage wherein heat storage levels are indicated by storage temperature;

means supplying heat energy to said storage;

heat load means for continuously removing heat from said storage corresponding to ambient temperature;

means limiting heat supplied to storage during alternate power on and power off periods;

means measuring ambient temperatures at predetermined time within said power on intervals;

means measuring storage temperature at predetermined times within said power on interval;

means retaining an initial storage temperature dependend on prior system heat load demand;

means determining an initial system heat load corresponding to prior system heat requirements, and ambient temperature;

means determining a current system heat load based on said initial load and said measured ambient temperature;

means determining a final storage temperature based on said measured ambient temperature and current heat load;

means determining required storage input heat energy based on said final storage temperature, measured ambient temperature, system loss, and said power-on interval;

means varying storage energy input in accordance with said determined input heat energy wherein heater storage capacity is compensated for heat load variations so as to supply system heat load requirements during a power off interval.

2. The controller described in claim 1 wherein said power-on interval further comprises at least one additional interval of less duration.

3. The controller of claim 1 wherein said retaining means and means determining system heat load, final storage temperature and storage heat input comprises a microprocessor.

4. A controller for a stored energy heater, supplying thermal energy from a power source to a system having varying heat requirements during preset cyclic power on-power off intervals, for adjusting energy storage during power on periods comprising;

a heater having heat energy storage, wherein storage media temperature indicates available heat;

means determining successive heater sampling intervals within said power on periods;

means measuring and retaining storage temperatures on initiation of each said interval;

means determining and retaining the energy input level for an immediately preceding interval;

means determining an expected storage temperature based on said measured storage temperature, said energy input level at said interval onset, and interval duration;

means comprising said measured and expected storage temperature and generating an energy difference signal;

means comparing said difference signal with a predetermined signal band;

means adjusting said storage energy input so as to bring said storage temperature within said signal band.

5. The controller of claim 4 wherein said interval, energy, and temperature determining; energy input retaining, storage temperature comparing and storage energy adjusting means include a microprocessor.

6. A controller for adjusting storage temperatures in a stored energy heater supplying continuous heat from electric power to a system heat load having varying heat demands, during predetermined, cyclic power off periods comprising;

means establishing power off and power on periods;

means measuring storage and load temperatures at predetermined times within said period;

means determining the heat storage level at said measurement time based on said storage and load temperatures;

means determining a current heat demand based on said load temperatures;

means determining a level of storage power input based on said demand and power on interval;

whereby tank storage is adjusted in a power on period to meet system demands during a succeeding power off period.

7. The controller of claim 6 wherein said period establishing, level demand, and storage power determining means is a microprocessor.

8. In a controller for adjusting storage temperatures in a stored energy heater utilizing electrical energy and limiting an overall user electrical load to a pre-determined maximum, comprising;

means establishing a measurement interval;

means measuring and storing a first heater storage temperature during said interval;

means measuring and storing a second heater storage temperature in a succeeding interval;

means comparing said first and second temperatures, and generating a power level signal;

means measuring overall user electrical load and establishing a current load signal;

means comparing said power level and current overall electrical load signals with a predetermined value, and generating a load adjustment signal;

means responsive to said adjusting signal, for varying heater electrical input;

wherein heater storage is adjusted to accomodate varying demand, within said predetermined maximum.

9. The controller of claim 8 wherein said interval establishing, temperature storing, temperature comparing power level signal generating, and generating means comprise a microprocessor.

10. The controller of claim 8, further comprising;

means establishing successive heater sampling periods within said measurement interval;

means measuring and retaining storage temperatures on initiation of each said period;

means determining and retaining the energy input level for the immediately preceeding period;

means determining an expected storage temperature based on said measured storage temperature, said energy input level at the onset of said period, and period duration;

means compared said measured and expected storage temperature and generating an energy difference signal;

means comparing said signal with a predetermined signal band;

means adjusting said storage energy input so as to bring said storage temperature within said band.

* * * * *